United States Patent [19]

Schafler et al.

[11] Patent Number: 4,486,369

[45] Date of Patent: Dec. 4, 1984

[54] CONTROLLED ENVIRONMENT EXTRUSION APPARATUS AND METHOD

[75] Inventors: R. S. Schafler; Norman I. Schafler, both of New York, N.Y.

[73] Assignee: Condec Corporation, Old Greenwich, Conn.

[21] Appl. No.: 550,124

[22] Filed: Nov. 9, 1983

[51] Int. Cl.³ .............................................. B29D 27/00
[52] U.S. Cl. ..................................... 264/51; 264/101;
264/148; 264/334; 425/377; 425/817 C;
425/DIG. 60; 425/308
[58] Field of Search ................. 264/51, 101, 334, 148;
425/377, 817 C, DIG. 60, 308

[56] References Cited

U.S. PATENT DOCUMENTS

| | | | |
|---|---|---|---|
| 3,704,083 | 11/1972 | Phipps | 425/378 X |
| 3,798,337 | 3/1974 | Abalo | 264/101 X |
| 3,871,812 | 3/1975 | Phipps | 425/817 C |
| 4,044,084 | 8/1977 | Phipps | 264/51 |
| 4,201,534 | 5/1980 | Phipps | 264/51 |
| 4,211,739 | 7/1980 | Phipps | 264/51 |
| 4,234,529 | 11/1980 | Phipps | 264/51 |
| 4,364,722 | 12/1982 | Phipps | 264/51 X |

*Primary Examiner*—Philip Anderson
*Attorney, Agent, or Firm*—Maky, Renner, Otto & Boisselle

[57] ABSTRACT

Foam extrusion apparatus and methods employing a vacuum chamber at reduced pressure into which foamable material is continuously extruded, hardened and cut to length, means for inventorying a plurality of successively cut lengths in a second chamber then at such reduced pressure, and means for discharging the inventory from the second chamber to the outside after the second chamber has been brought to atmospheric pressure without affecting the reduced pressure in the vacuum chamber. Stacking devices are employed to inventory the cut lengths in either a vertical or horizontal stack for transfer as a stack into and/or out of the second chamber. Provision also is made for accumulating the boards in close but spaced facial relationship with substantially the entire surface areas of the cut lengths exposed to the reduced pressure prior to stacking and discharge to the atmosphere. Also encompassed are multiple second chambers which cycle between the reduced and atmospheric pressure in out of phase relationship whereby one or more cut lengths may be transferred into one second chamber then at reduced pressure, and then discharged therefrom when at atmospheric pressure while one or more subsequently cut lengths are transferred into another extraction chamber then at reduced pressure.

48 Claims, 9 Drawing Figures

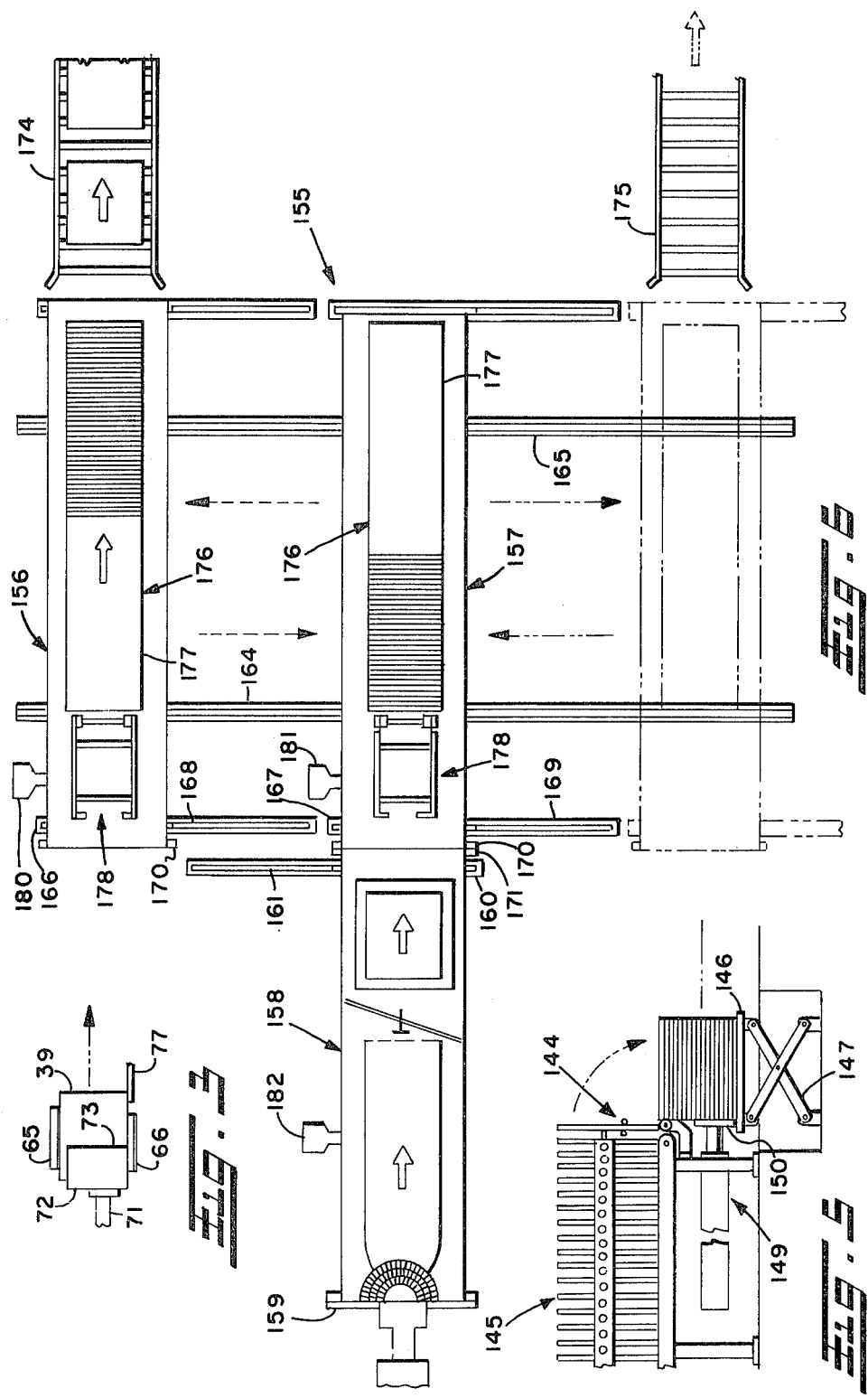

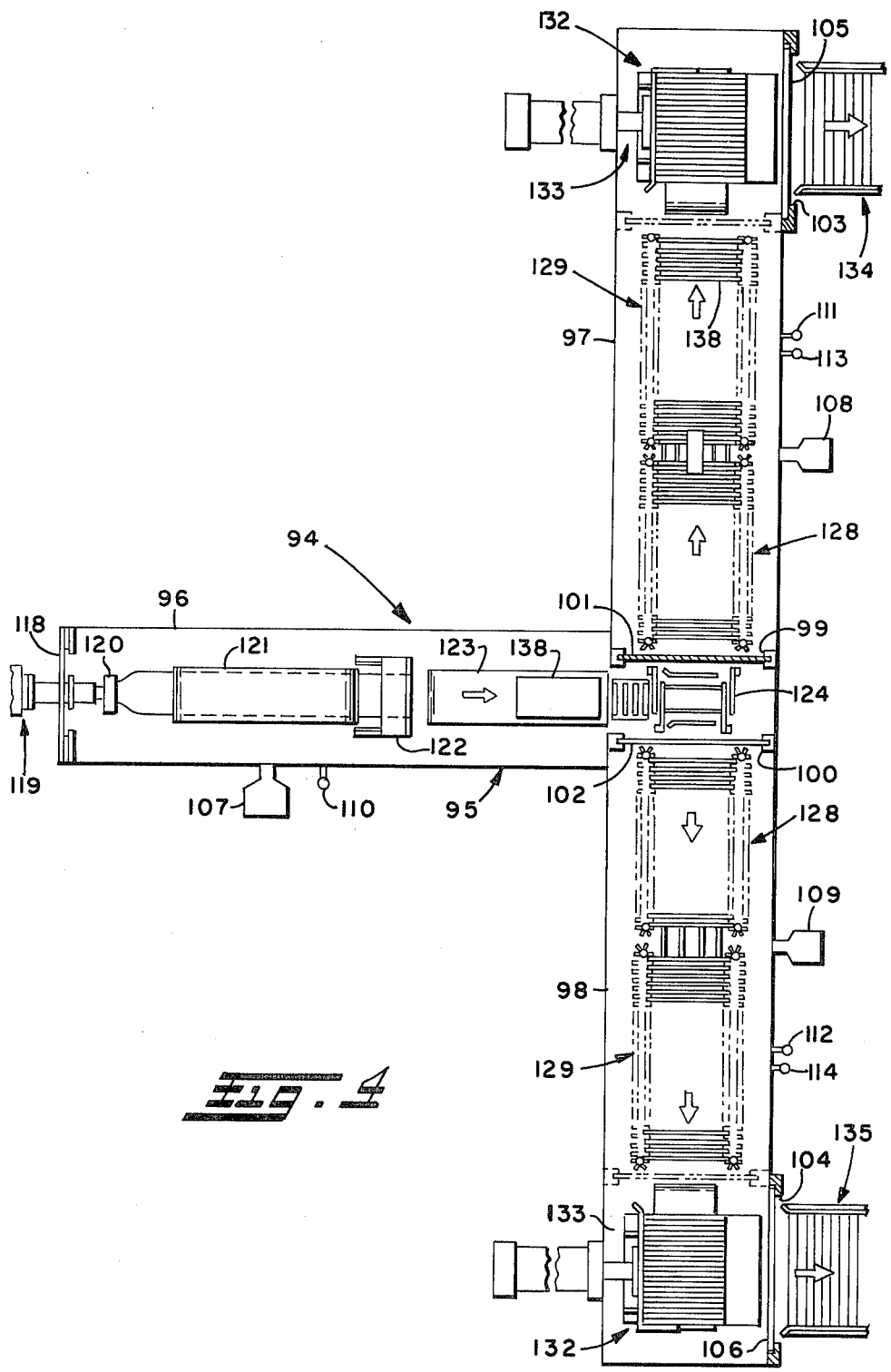

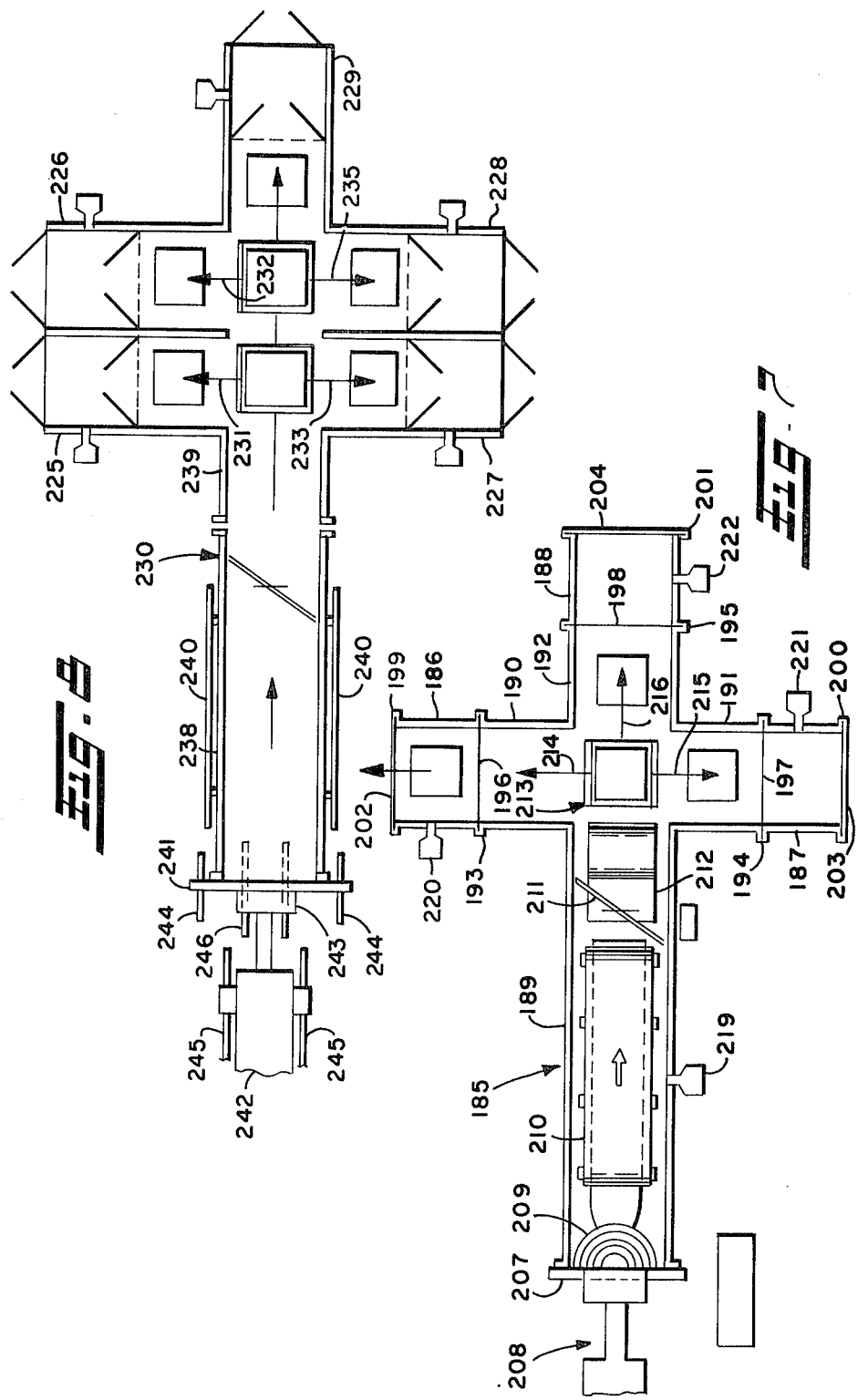

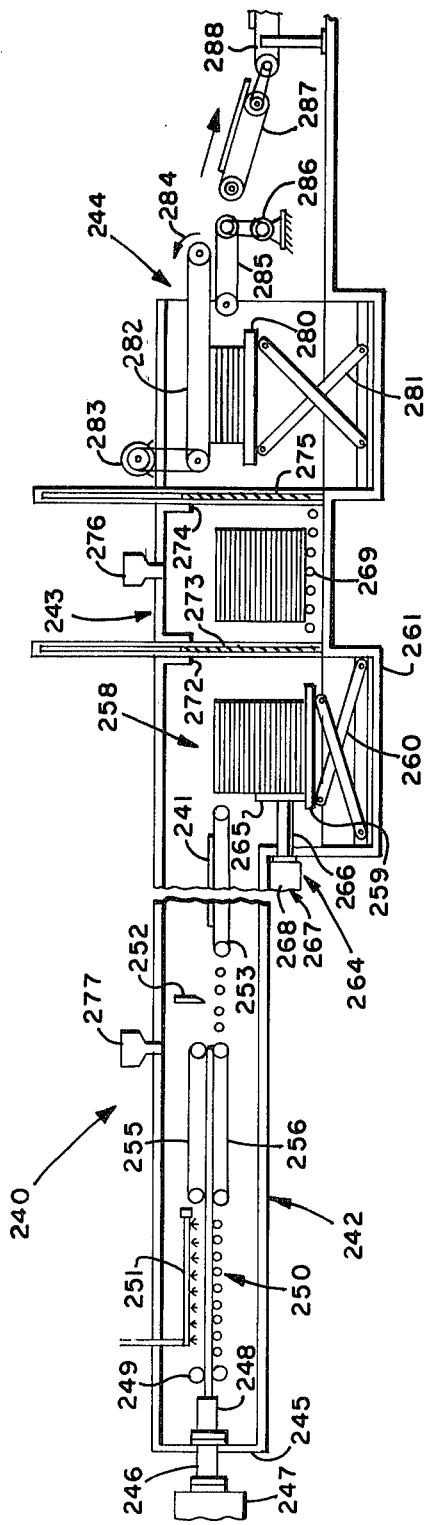

CONTROLLED ENVIRONMENT EXTRUSION APPARATUS AND METHOD

This invention relates generally to controlled environment extrusion technology and, more particularly, to improved apparatus and methods which provide for economical and energy efficient extraction of foam bodies from a vacuum chamber wherein foamable material is continuously extruded and cut to predetermined length.

BACKGROUND

As is known, the formation of extruded foam bodies in the form of boards, planks, billets, etc., can be enhanced by the employment of a vacuum chamber wherein expansion of continuously extruded foamable material is accomplished under sub-atmospheric pressure. This, however, necessitates removal of the foamed extrudate from the vacuum chamber, and to do so without adversely affecting the controlled environment (reduced pressure) in such chamber has presented a difficult problem for solution.

One known solution to this problem involves the employment of an inclined barometric leg which permits continuous removal of the extrudate from a vacuum chamber at the top of the leg in either continuous or descrete lengths to the atmosphere without affecting the reduced pressure within the vacuum chamber. For further details of this technique, reference may be had to prior U.S. Pat. Nos. 3,704,083 and 4,044,084.

Another solution to the extraction problem is set forth in copending U.S. application Ser. No. 537,832, filed Sept. 30, 1983, and entitled "Process and Apparatus for Producing Foamed Synthetic Resin Bodies." This solution generally involves the continuous extrusion of foamable material into a reduced pressure chamber or zone, cutting the foamed extrudate to length in such reduced pressure chamber, transferring the cut length into a second contiguous chamber or zone which cylically alternates between such reduced pressure and atmospheric pressure, such transfer being effected when the second chamber is at reduced pressure, and then discharging the cut length from the second chamber to the atmosphere when such second chamber is at atmospheric pressure. Although such solution generally is advantageous, the extraction procedure requires a large number of vacuum cycles per hour in order to achieve a desired level of output. For example, an extrusion rate of 50 feet per minute would require 375 vacuum cycles per hour. Moreover, the required cycle time would be relatively short thus necessitating the usage of a relatively large vacuum pump and/or accummulater system. It also is noted that there is no provision for a relatively long residence time for the cut lengths at reduced pressure as may be desired to allow full expansion, cooling and dimensional stabilization thereof, except perhaps by operating at correspondingly slow extrusion rates or by employing a correspondingly long reduced pressure chamber.

SUMMARY OF THE INVENTION

The present invention relates to certain improvements in apparatus and methods which provide for continuous extrusion of material, such as foam, into a controlled environment, such as a vacuum chamber or zone at reduced pressure, and cutting the extrudate to length within such vacuum chamber. In accordance with the present invention, the cut lengths are extracted from the vacuum chamber by inventorying a plurality of the cut lengths in an extraction chamber or zone then at reduced pressure and thereafter discharging the inventory from the extraction chamber to the atmosphere without affecting the reduced pressure in the vacuum chamber. In particular, the extraction chamber, in a manner similar to an air lock, cyclically alternates between such reduced pressure and atmospheric pressure for assembly or receipt of an inventory of a number of cut lengths during the reduced pressure portion of the cycle and discharge of the inventory during the atmospheric pressure portion of the cycle when the vacuum and extraction chambers are closed with respect to each other by a sealed gate. Such improvement generally gives rise to a significant reduction of required vacuum cycles and a vacuum foam extrusion system which is energy efficient and operable economically at high extrusion rates.

Further in accordance with the invention, stacking and ejector devices also are employed to stack the cut lengths vertically (in horizontal position) or horizontally (in vertical position) and then to transfer the cut lengths as a stack into and/or out of the extraction chamber. Provision also is made for righting the cut lengths from horizontal to vertical position and then accumulating the same in one or more accumulating conveyors which convey the cut lengths on edge in close but spaced facial relationship with substantially the entire surface areas of the cut lengths exposed to reduced pressure for a desired minimum residence time and cooling is maximized. Therefore, in one embodiment of the invention, two such conveyors are employed in serial arrangement within the vacuum chamber, the downstream one of which accelerates when full to quickly advance the cut lengths therein to an extraction chamber for stacking and subsequent discharge as a stack from the extraction chamber. Of course, the boards can also be vertically stacked so that there is no air gap, if it is deemed satisfactory.

According to another aspect of the invention, multiple extraction chambers or air locks are employed along with means for effecting selective transfer of the cut lengths to such extraction chambers when at reduced pressure, and from the respective extraction chambers when at atmospheric pressure. The extraction chambers cycle between reduced and atmospheric pressures in out of phase relationship whereby one or more cut lengths may be transferred into one extraction chamber then at reduced pressure, and then discharged therefrom when at atmospheric pressure while one or more subsequently cut lengths are transferred into another extraction chamber then at reduced pressure. In one particular arrangement, a multi-directional transfer device or devices downstream of an extrudate cut-off device within the vacuum chamber provide for selective transfer of the cut lengths to extraction chambers of any desired number located at opposite sides and/or the end of the vacuum chamber. In another arrangement, extraction chambers are mounted for movement into and out of alignment with the downstream or exit end of the vacuum chamber for receipt of the cut lengths when aligned and at reduced pressure and discharge of the cut lengths when in a transposed position and at atmospheric pressure.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 3 is a schematic side elevational view of a stacking and ejector device which may be utilized to assemble a horizontal stack of cut lengths (in vertical position) within the extraction chamber and then discharge such stack from the extraction chamber;

FIG. 4 is a schematic top plan view of an embodiment of the invention employing at the downstream end of a vacuum extrusion chamber a bi-directional pivoting device for righting and selective transfer of the cut lengths to accumulating conveyors associated with respective extraction.

FIG. 5 is a schematic side elevational view of another stacking and ejector arrangement which may be utilized at the end of the accumulating conveyors for returning the cut lengths to horizontal position in a vertical stack for ejection from an extraction chamber;

FIG. 6 is a schematic top plan view of an embodiment of the invention wherein two extraction chambers with respective accumulators for the cut lengths are transversely movable into and out of alignment with a vacuum extrusion chamber;

FIG. 7 is a schematic top plan view of an embodiment of the invention wherein a multi-directional transfer device selectively delivers the cut lengths to three stationary extraction chambers at opposite sides and the end of a vacuum extrusion chamber;

FIG. 8 is a schematic top plan view of an embodiment of the invention similar to that seen in FIG. 7, but employing five stationary extraction chambers; and FIG. 9 is a schematic side elevational view of an embodiment according to the invention including a board stacking and stack transfer device within the vacuum chamber thereof and a destacking device outside the extraction chamber.

DETAILED DESCRIPTION

Figure 1:
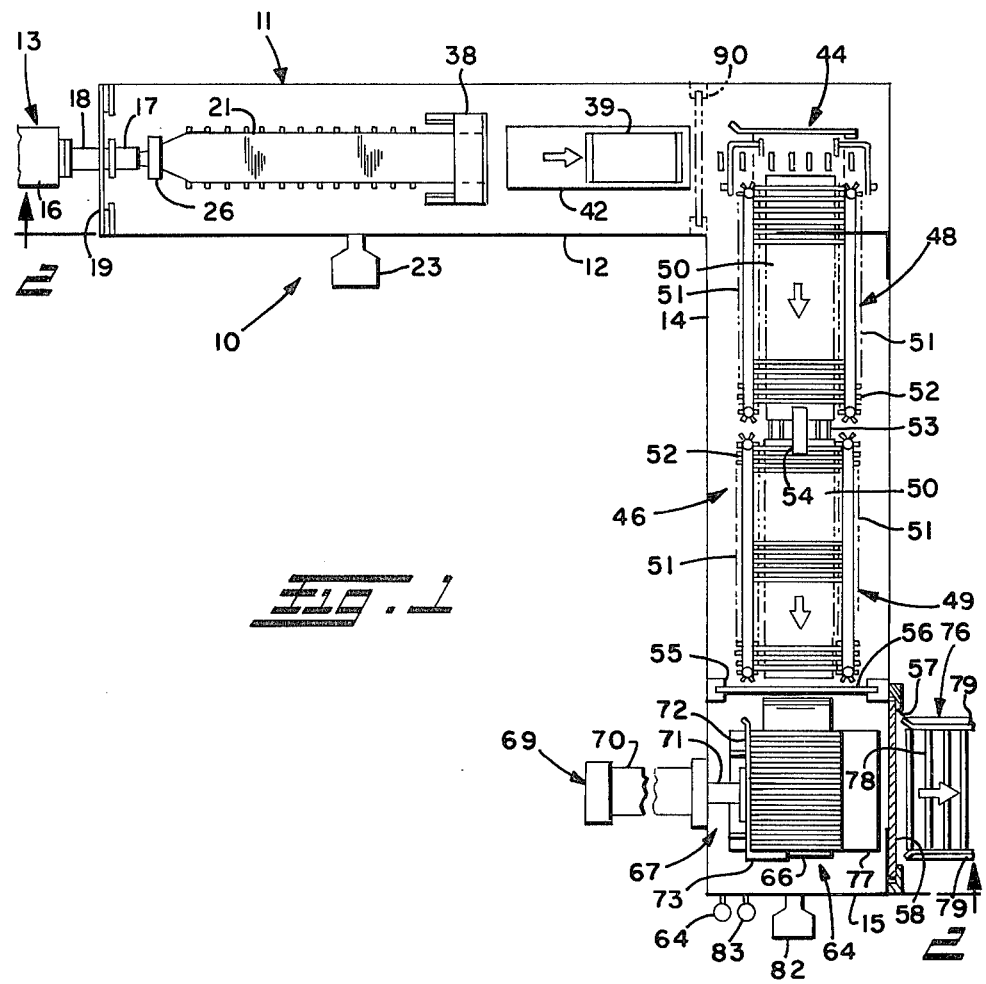
FIG. 1 is a schematic top plan view of one embodiment of vacuum foam extrusion apparatus according to the invention wherein foamable material is continuously extruded horizontal and cut to length in a vacuum chamber, and the cut lengths turned on edge and conveyed within the vacuum chamber by accumulating conveyors to an extraction chamber where the boards are stacked in vertical position and then discharged to the atmosphere.
Figure 2:
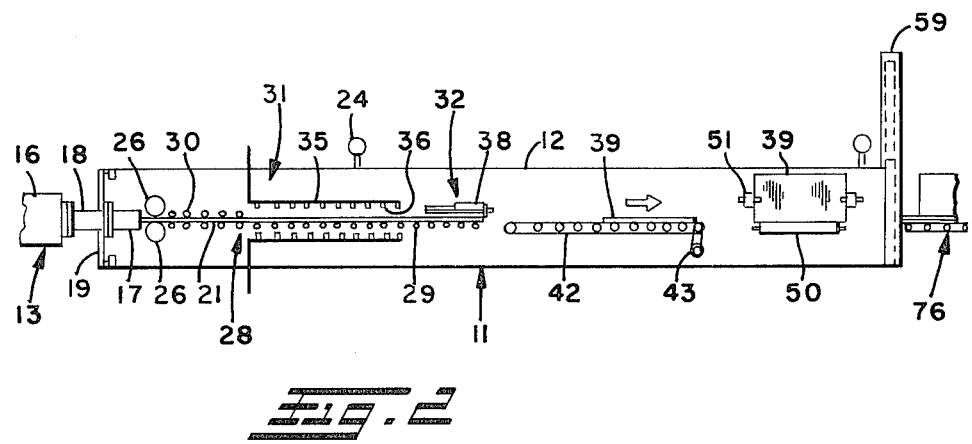
FIG. 2 is a schematic part elevational, part sectional view of the apparatus of FIG. 1 as seen from and taken along the line 2—2 thereof.

Referring now in detail to the drawings and initially to FIGS. 1 and 2, one embodiment of vacuum foam extrusion apparatus according to the invention, designated generally by reference numeral 10, can be seen to include an L-shape vacuum chamber 11 having one leg 12 terminating at an extruder system 13 and the other leg 14 terminating at an extraction chamber or air lock 15. The extruder system 16 includes at least one extruder 16 coupled to an extrusion die 17 by a pipe 18 which extends through a bulkhead 19 that closes the end of vacuum chamber leg 12. The extruder 16 and bulkhead 19 may be mounted for independent movement towards and away from the vacuum chamber leg 12 along the latter's axis to provide access to the interior of the vacuum chamber and the extrusion line components housed therein. For a description of the general manner in which the extruder, bulkhead and extrusion die may be constructed and operated, reference may be had to U.S Pat. No. 4,211,739. It is noted, however, that such patent employs an inclined barometric leg defining a vacuum chamber at its upper end whereas the vacuum chamber 11 of the present invention desirably is horizontal and supported on a level flow in a building. Consequently, the bulkhead 19 may extend vertically for mating sealed contact with a vertical end face of the vacuum chamber leg 12 in contrast to the bulkhead seen in such patent with appropriate modifications being made in this regard. Also, the vacuum chamber 11 and the bulkhead 19 may have a rectangular transaxial cross-sectional shape as is desired and indicated, or it may have a radial chamber.

The extrusion die 17 preferably has an acuate orifice and generally may be of the type disclosed in U.S Pat. Nos. 3,871,812, 4,201,534 and 4,364,722. The extrusion dies in these patents facilitate obtainment of proper die orifice shape and size for a desired profile of an extruded product such as foam boards, planks, billets, etc. In the contemplated application, the arcuate die orifice is oriented horizontally for extrusion of a continuous length of horizontally disposed foamed extrudate, indicated at 21, which travels along the vacuum chamber leg 12. Other dies, such as flat faced fixed orifice configurations with shaper plates, may also be used.

When in use, the vacuum chamber 11 is evacuated by a suitable vacuum pump indicated at 23 in FIG. 1 while a bleed valve indicated at 24 in FIG. 2 may be provided controllably to admit air into the vacuum chamber to control the degree of vacuum. Along with the extrusion die 17, the vacuum chamber houses at reduced pressure various other extrusion line components which will now be described.

Going from left to right in FIGS. 1 and 2, the extrusion line components housed within the vacuum chamber 11 at the leg 12 include shaping rolls 26 located above and below the extrudate path and closely adjacent the extrusion die 17 for facilitating expansion molding of foamable material as such material is extruded into the vacuum chamber 11 at reduced pressure. As is preferred, the shaping rolls actually may consist of upper and lower arrays of arcuate shaping rolls generally of the type disclosed in U.S. Pat. No. 4,234,529. The rolls on one or both sides of the extrudate path may be rotatably driven to take-up and facilitate expansion of the foamed extrudate to desired size and shape. Linear rolls may also be employed (driven or free rotating). The radial or linear rolls may be controlled "up" or "down" by air cylinders. Of course, shaper plates may be used in place of or in combination with rollers.

Continuing along the path of the extrudate, an extrudate takeaway conveyor assembly 28 extends from the shaping rolls 26 to approximately midway the length of the vacuum chamber leg 12 for transporting the foamed extrudate 24 away the extrusion die 17 and shaping rolls 26. As shown, the conveyor assembly 28 includes a plurality of rollers 29 extending transversely beneath the extrudate path and an initial run of rollers 30 extending transversely above the extrudate path. At least some or all of such rollers 29 and 30 may be rotatably driven to advance the foamed extrudate 24 away from the extrusion die 17 through a cooling station indicated at 31 and to a cut-off station indicated at 32.

At the cooling station 31, there is provided water applicators 35 which are located above and below the extrudate path coextensively with the middle portion of the conveyor assembly 28. The water applicator 35 includes a large number of spray nozzles 36 which spray water downwardly onto the foamed extrudate 24 passing therebeneath. Another but inverted water applicator as illustrated also may be provided beneath the extrudate path coextensively with the applicator 35 for spraying water upwardly onto the foamed extrudate for uniform top and bottom cooling.

At the cut-off station 32, an extrudate cut-off device 38 is provided to cut the continuous length of extrudate being fed by the conveyor assembly 28 into pieces of desired length. The cut-off device may be a conventional cutter of circular saw or hot wire type, and suitable sensors and controls (not shown) may be provided to control the cut-off operation which in the present embodiment provides cut pieces of equal length. For purposes of this disclosure, the term "board" or the plural thereof hereinafter will be used in general reference to the cut piece or pieces of extrudate commonly identified by reference numeral 39, it being understood that the "board" or "boards" may have profiles other than that generally associated with a board.

Continuing to the right in FIGS. 1 and 2, a board take-away conveyor 42 extends from the cut-off device 38 beneath the path of the boards 39. The conveyor 42, which may be of conveyor belt type as illustrated, preferably is powered as by a drive 43 at a higher speed than the conveyor assembly 28. Accordingly, each board as it is cut from the continuous length of the extrudate 24 will be accelerated and quickly conveyed away from the cut-off device and to a board pivoting device generally indicated at 44.

The board pivoting device 44 is located at the union of the vacuum chamber legs 12 and 14 and at the entry end of a board accumulating and conveying mechanism 46 which extends substantially the length of the leg 14. The board pivoting device may be of conventional type, such being operative to right each board received therein, i.e., to pivot the board from horizontal to vertical position, for subsequent receipt and transfer in vertical position to the board accumulating and conveying mechanism.

The board accumulating and conveying mechanism 46 comprises upstream and downstream board conveyor assemblies 48 and 49 which are serially arranged end-to-end. Such assemblies may be of like construction, each including a bottom belt conveyor 50 on which the boards are supported and conveyed on edge, and parallel side belt conveyors 51 extending coextensively with and at opposite sides of the bottom conveyor 50. Whereas the bottom conveyor is horizontally disposed, the side conveyors are vertically disposed at an elevation above the bottom conveyor as seen in FIG. 2. As shown, the belt of each side conveyor carries a plurality of projecting catches or pins 52 which are equally spaced along the length of the belt by an amount corresponding to the thickness of the boards.

The bottom conveyor 50 and side conveyors 51 of each conveyor assembly 48, 49 are synchronously driven so that each board received at the entry end of each conveyor assembly will be engaged at its vertical edges between respective catches on the side conveyors and then conveyed on edge along such conveyors. Each board also will be held apart from adjacent boards in spaced facial relationship so that if necessary, substantially the entire surface area of each board will be exposed to the reduced pressure in the vacuum chamber 11 and to facilitate further cooling. To facilitate the transfer of boards from the upstream conveyor assembly 48 to the downstream conveyor assembly 49, relatively short and narrow, upper and lower transfer devices or conveyors of any suitable type are provided to span the gap between such assemblies 48 and 49 as seen at 53 and 54 in FIG. 1, respectively.

For extraction of the boards 39 from the vacuum chamber 11 without affecting the reduced pressure therein, the downstream end of the vacuum chamber leg 18 is connected to the aforementioned extraction chamber or air lock 15 by a sealed gate 55 which is opened and closed by an air lock door 56. At right angle to the sealed gate 55, the extraction chamber also is connected to the atmosphere by a sealed outlet gate 57 which may be opened and closed by air lock door 58. When closed, the gate 55 seals off the end of the vacuum chamber leg 18 whereas both gates 55 and 57 seal off the extraction chamber. The air lock doors 56 and 58 may be of sliding type which when open retract into respective sealed pockets, that for the door 58 being seen at 59 in FIG. 2. The seal may also be achieved through rigid flaps with seals or other types of seals common to industry.

The gate 55 is sized to permit passage of the boards 39 exiting the downstream board conveyor assembly 49 in vertical position to a board stacking and stack ejector device 64 located in the extraction chamber 15. As seen in FIGS. 1 and 3, the device 64 includes top and bottom belt conveyors 65 and 66 which extend horizontally away from the conveyor assembly 49 beginning at a point just inside the gate 55. Suitable retractable means (not shown) may be employed to move into and facilitate transfer of the boards across the gap in which the door 56 resides when closed.

The bottom belt conveyor 66 is coplanar with the bottom belt conveyor 50 of the downstream board conveyor assembly 49 whereas the top belt conveyor 65 is spaced above the bottom belt conveyor 66 by a distance corresponding to the height of the boards 39 whereby the boards may be engaged top and bottom by the conveyors 65 and 66, as seen in FIG. 3. Accordingly, the boards exiting the conveyor assembly 49 may be gripped and held on edge and between the belt conveyors 65 and 66 which may be synchronously driven to advance the boards therealong and in front of a stack ejector 67 located at the side of the extraction chamber 15 opposite the outlet gate 57.

The stack ejector 67 comprises a long stroke piston-cylinder assembly or ram 69 extending horizontally at right angle to a vertical center plane through the belt conveyors 65 and 66. The cylinder 70 of the ram 69 preferably is located outside the extraction chamber 15 with the rod 71 of the ram extending through a sealed opening in the side wall of the extraction chamber opposite the outlet gate 57. Connected to the end of the rod 71 is a vertical stack pusher plate 72 extending parallel to the conveyors 65 and 66. The upstream vertical edge of such plate 72 may be outwardly bent at an acute angle to facilitate alignment of the boards being conveyed by and between the belt conveyors 65 and 66, such plate being at an elevation intermediate the elevations of such conveyors as seen in FIG. 3. At its downstream vertical edge, the pusher plate is joined to a vertical stack abutment plate 73 which extends perpendicularly to the pusher plate at the downstream end of the belt conveyors 65 and 66.

When the ram 69 is retracted, the pusher plate 72 will be located at one side of the path of the boards being conveyed by the top and bottom belt conveyors 65 and 66 while the stack abutment plate 73 will extend into the path of the boards for horizontal stacking of the boards thereagainst by the belt conveyors. The plate 73 further will position the stacked boards in front of the pusher plate which has a width at least equal to or greater than the combined width of the stacked boards of preselected number. Accordingly, upon extension of the ram, the pusher plate will engage each board in the stack and move the same as a stack to the right in FIGS. 1 and 3, and through the outlet gate 57 onto a stack or board inventory take-away conveyor 76. Of course, the outlet gate 57 is of sufficient size to permit discharge of the stack therethrough. There also may be provided a horizontal support plate 77 between the lower stacking conveyor 66 and the outlet gate 57 over which the stack slides during discharge from the extraction chamber. With regard to the stack take-away conveyor 76, such may include transversely extending driven rollers 78 and logitudinally extending guides 79 at opposites thereof for conveying each discharged vertical stack away from the extraction chamber.

When sealed off upon closure of both gates 55 and 57, the extraction chamber 15 may be evacuated independently of the vacuum chamber 11 by a vacuum pump seen at 82 and the reduced pressure therein controlled by a bleed valve indicated at 83 in FIG. 1. A vacuum break valve 84 also may be provided for rapidly vitiating developed vacuum in the extraction chamber. In accordance with the method of the invention more fully described hereinafter, the vacuum in the extraction chamber is generated and vitiated and the gates 55 and 57 opened and closed to enable inventorying of boards in the extraction chamber as by stacking and discharge of the inventory or stack from the extraction chamber without affecting the reduced pressure in the vacuum chamber.

In operation of the extrusion apparatus 10, foamable material is extruded through the extrusion die 17 into the vacuum chamber 11 which initially may be at atmospheric pressure during start-up and then evacuated and maintained at a selected sub-atmospheric pressure by operation of the vacuum pump 23 and bleed valve 24. As the foamable material exits the die, it will immediately begin to expand under the influence of reduced pressure and move away from the die to and between the shaping rolls 26 which may control the expansion molding process and draw the expanding foam from the extrusion die. From the shaping rolls, the foamed extrudate 24 is transported by the conveyor assembly 28 and cooled by application of water from the water applicator 35 so that upon reaching the cut-off device 38, the extrudate will be relatively rigid or hard. As the extrudate passes through the cut-off station 32, it is successively cut to form boards 39 of predetermined length. As soon as each board is severed from the continuous length of extrudate, it is accelerated and quickly transported by board take-away conveyor 42 to the board pivoting device 44.

When the presence of a board 39 at the board pivoting device 44 is detected by any suitable means, such device is operated to turn the board on edge and present the same in vertical position for receipt by the upstream board accumulating conveyor assembly 48 between opposed sets of board catches 52 on the side conveyors 51 of such conveyor assembly. Such catches initially may be positioned in an open condition for receipt of the board and then indexed by operation of the assembly 48 a short distance to capture the board between such catches as well as to open the next sets of catches for receipt of the next board. After the board has been thusly transferred and indexed along the assembly 48, the pivoting device 44 is returned to its original position for receipt and transfer of the next board delivered by the take-away conveyor 42. In this manner, a number of successively cut boards may be accumulated in the upstream conveyor assembly 48 for transport through the vacuum chamber leg 14. Also, the boards will be held in vertical position and spaced apart a short distance with substantially the entire surface area of each board exposed to reduced pressure for facilitating any further expansion and dimensional stabilization of the boards. As will be appreciated, the conveyor assemblies 48 and 49 and the associated portion of the vacuum chamber 11 may be relatively compact in length yet provide desired residence time for the boards at reduced pressure.

Each board 39 reaching the end of the upstream conveyor assembly 48 will be transferred to the downstream conveyor assembly 49 for continued movement along the latter. Initially, the downstream conveyor assembly may operate at the same speed as or synchronously with the upstream conveyor assembly until full with a preselected number of boards. Once filled, the downstream conveyor assembly accelerates and quickly discharges the boards into the extraction chamber 15 and between the stacking conveyors 65 and 66 which operate quickly to inventory the boards as a stack in front of the ejector device 67. It is noted that at this time, the gates 55 and 57 respectively will open and closed, and the pressure in the extraction chamber will be at the same reduced pressure as the vacuum chamber 12. After being emptied, the downstream conveyor assembly 49 is restored to its prior operative mode in such time to receive from the upstream conveyor assembly 48 the first board of a next to be formed stack.

After the boards have been stacked in the extraction chamber 15, the gate 55 is closed and the vacuum in the extraction chamber vitiated in order to bring the extraction chamber to external or atmospheric pressure. The gate 57 then is opened and the stack of boards discharged from the extraction chamber onto the stack take-away conveyor 76 upon operation of the ejector device 67 as aforedescribed. After the ram 69 has been retracted to return the pusher plate 72 to its initial position, the gate 57 is closed and the extraction chamber restored to reduced pressure equal to that in the vacuum chamber 12. After equivalency is established, the gate 55 is again opened thereby bringing the extraction chamber into communication with the vacuum chamber for formation of a next stack of boards in the foregoing manner.

In view of the foregoing, a large number of boards such as 50 or so may be inventoried in the extraction chamber 15 and discharged therefrom during each vacuum cycle. Accordingly, the apparatus 10 and associated method provide a relatively long cycle time during which the extraction chamber 15 is brought to atmospheric pressure and thereafter restored to reduced pressure. Also, the number of such cycles required per time period may be greatly reduced by a factor corresponding to the number of boards inventoried and discharged during each cycle. Moreover, a relatively long residence time for the boards at reduced pressure may be provided even at high extrusion rates yet in a relatively compact manner.

The apparatus 10 may be modified in various ways and yet still achieve the noted benefits and advantages. For example, the gate 55 may be located between the board take-away conveyor 42 and the board pivoting device 44 as seen in phantom lines at 90 in FIG. 1. Accordingly, the entire length of the leg 14 would form the extraction chamber or air lock which cycles between reduced and atmospheric pressures. This, however, would necessitate a longer board take-away conveyor temporarily storing boards within the vacuum or extrusion chamber during such time that the gate 90 is closed and the extraction chamber operated to discharge accumulated boards therefrom.

The FIG. 4 Embodiment

In FIG. 4, another embodiment of vacuum foam extrusion apparatus according to the invention, indicated generally at 94, can be seen to employ a controlled environment housing 95 in the shape of a T. The stem of the T constitutes a vacuum chamber 96 while the arms thereof constitute respective extraction chambers or air locks 97 and 98. The extraction chambers 97 and 98 are connected to opposite sides of the vacuum chamber 96 at its downstream or exit end by respective sealed gates 99 and 100 which are opened and closed by respective doors 101 and 102. The extraction chambers 97 and 98 also are connected at their downstream ends to the atmosphere or outside by sealed outlet gates 103 and 104 which are opened and closed by air lock doors 105 and 106, respectively. The chambers 96-98 are provided with respective vacuum pumps 107-109 and bleed valves 110-112 for generating and controlling reduced pressure therein independently of the other chambers. The extraction chambers 97 and 98 further may be provided with respective vacuum breaker valves 113 and 114 for rapidly vitiating the vacuum therein.

Like in the aforedescribed apparatus 10, the vacuum chamber 96 is closed at its upstream end by a bulkhead 118 associated with an extruder system 119. The vacuum chamber also accomodates therein extrusion line components similar to those in the apparatus 10 including shaping rolls 120, an extrudate take-away conveyor 121, a cut-off device 122, a board take-away conveyor 123 and a board pivoting device 124, except that the board pivoting device 124 is of bi-directional type. Although not show, suitable extrudate cooling means also may be provided upstream of the cut-off device.

The board pivoting device 124 is located between the sealed gates 99 and 100 and may be of any suitable type which operates bi-directionally to upend a board onto either edge thereof for respective transfer in vertical position to either one of the extraction chambers 97 and 98. In each extraction chamber, there is provided upstream and downstream board accumulating conveyor assemblies 128 and 129 for receiving the boards from the board pivoting device and conveying the same on edge through the extraction chamber. Such conveyor assemblies may be similar in construction to those described above for transporting the boards on edge in close but spaced facial relationship.

At the downstream or exit end of each extraction chamber 97, 98, there is provided a board stack and stack ejector device 132 similar to that described above which receives the boards exiting the downstream conveyor assembly 129 and inventories the same into a stack in front of a stack ejector 133. Like before, the stack ejector 133 is operative to push to stack through the respective outlet gate 103, 104 of the respective extraction chamber 97, 98. Outwardly adjacent the outlet gates 103 and 104, respective stack take-away conveyors 134 and 135 are provided to receive and transfer each discharged stack to other processing machinery.

The apparatus 94 generally operates in a manner similar to that described with respect to the apparatus 10 of FIGS. 1-3. As before, the cut lengths of boards 138 are transferred by the board take-away conveyor 123 in succession to the board pivoting device 124. Initially, the board pivoting device operates in one directional mode upending and transferring the boards to the upstream conveyor assembly 128 in only one of the extraction chambers 97, 98 then in communication with the vacuum chamber 96. By way of example, the sealed gate 99 may be opened and the boards transferred to and accumulated in the conveyor assemblies 128 and 129 in the extraction chamber 97 then at reduced pressure. Of course, the outlet gate 103 of the chamber 97 will be closed. Such board transfer will continue until suuh conveyor assemblies in the chamber 97 are fully loaded.

At this time, the sealed gate 99 is closed to seal off the extraction chamber 97 and the gate 100 opened (unless already open) to effect communication between the vacuum chamber 96 and the then empty extraction chamber 98 which has been evacuated to reduced pressure equivalent to that in the vacuum chamber. The board pivoting device 124 then operates in the reverse directional mode to upend and transfer the boards to the accumulating conveyor assemblies 128 and 129 in the extraction chamber 98.

Before or after closing the gate 99, the loaded conveyor assemblies 128 and 129 in the extraction chamber 97 may be temporarily halted to allow adequate residence time for the last received board at reduced pressure. After this and after the gate 99 has been closed to seal off the extraction chamber 97, the conveyor assemblies again are operated preferably at a relatively fast rate to feed a selected number of boards to the board stacking and stack ejector device 132 for stacking in front of the stack ejector 133. At the same time, the vacuum in the extraction chamber 97 may be vitiated and the outlet gate 103 opened. After the selected number of boards have been stacked, the stack ejector is operated to push the stack out of the extraction chamber and onto the stack take-away conveyor 134.

It is noted that the conveyor assemblies 128 and 129 in the extraction chamber 97 may hold enough boards to form one or more stacks. In the latter case, the accumulating conveyors may again be operated for assembly of another stack in front of the stack ejector 132 which stack then may be discharged onto the stack take-away conveyor 134. This process may continue until the conveyor assemblies have been emptied and all boards discharged from the extraction chamber 97. After this, the outlet gate 103 may be closed and the extraction chamber 97 evacuated to restore the same to reduced pressure equivalent to that in the vacuum chamber 96. At that time, the gate 99 may be opened once again to effect communication between the extraction chamber 97 on the vacuum chamber 96. Thereafter, when the conveyor assemblies 128 and 129 in the other extraction chamber 98 are full, the board pivoting device 124 can be operated to fill the now empty extraction chamber 97 with boards while the other extraction chamber 98 is operated to effect discharge of the therein accumulated boards in the same manner as aforedescribed in connection with extraction chamber 97.

The apparatus 94 as thus far described may further be provided with two additional sealed gates as seen in phantom lines at 140 and 141. As indicated, the gates 140 and 141 would be located in respective arms of the T-shape controlled environment housing 95 between the downstream conveyor assemblies 129 and the board stacking and stack ejector devices 132. Considering each arm individually, the sealed gate 140, 141 therein would correspond to the sealed gate 55 in the FIG. 1 embodiment. As a result, one arm may be sealed off and the apparatus 94 operated in the same manner as the FIG. 1 embodiment. This is desirable in the event that components associated with one arm fail or are rendered inoperative as for maintenance. In such event, the apparatus 94 may still be operated with components associated with the then utilized arm being operated to effect board accumulation, stacking and discharge to the atmosphere.

The FIG. 5 Alternative

In the above embodiments, each identified board stacking and stack ejector device operates to stack the boards in vertical position just as they are delivered from the board accumulating and conveying mechanism. Alternatively, the boards may be returned to horizontal position and vertically stacked one atop another. As schematically illustrated in FIG. 5, a board pivoting device 144 may be employed at the downstream end of the board accumulating and conveying mechanism here designated generally by reference numeral 145. The device 144 may be similar to that used at the head or upstream end of the mechanism 145, but operative in reverse manner to turn a board from vertical to horizontal position. Upon such pivoting to horizontal position, the board is deposited atop a stacking table or platform 146 which is supported for vertical movement by a scissor mechanism 147 or functionally equivalent means such as a hydraulic piston mechanism. As boards are stacked atop the platform, the scissor mechanism may be operated to adjust the height of the platform relative to the board pivoting device.

After a preselected number of boards have been stacked on the platform, the scissor mechanism 147 may be operated to lower the platform as needed to properly locate the stack in front of a stack ejector 149. The stack ejector, which may be similar to those described above, includes a vertical pusher plate 150 which is moved horizontally by suitable means to engage and push the stack horizontally such as for discharge through the outlet gate of an extraction chamber. With the illustrated arrangement, the outlet gate accordingly would be in line with the mechanism 145. Of course, the ejector may be oriented otherwise than as shown for horizontal ejection of the stack in any desired direction.

The FIG. 6 Embodiment

In FIG. 6, there is illustrated another embodiment of the invention, indicated at 155, wherein two extraction chambers or air locks 156 and 157 are transversely movable into and out of alignment with a vacuum chamber 158. The head of the vacuum chamber 158 is closed by a bulkhead 159 whereas the other or downstream end is closed by a sealed gate 160 which is opened and closed by an air lock door 161. The vacuum chamber has associated therewith extrusion line components similar to those described above although not all are necessarily shown.

The extraction chambers 156 and 157 ride on common rails 164 and 165 that extend normal to the vacuum chamber 158 for movement into and out of alignment with the vacuum chamber 159. The extraction chambers may be of similar construction, each having sealed inlet and outlet gates 166 and 167 at respective ends which are opened and closed by respective doors 168 and 169. At its upstream end, each extraction chamber also has a peripheral sealing flange 170 adapted to mate and seal against a similar flange 171 at the downstream end of the vacuum chamber upon alignment of such chambers. As will be appreciated, vacuum applied internally of the flanges will cause the same to be tightly drawn and sealed together by outside atmospheric pressure without the need for any additional fastening or securement means.

Any suitable drive may be employed to move or shuttle the extraction chambers 156 and 157 between aligned and transversely offset positions with respect to the vacuum chamber 158. Of course, only one extraction chamber may be aligned with the vacuum chamber at any one time. When in their respective offset positions, the extraction chambers will be aligned at their downstream ends with respective board take-away conveyors 174 and 175.

Each extraction chamber 156 and 157 contains therein a board accumulator 176 operative to hold at least one but preferably a relatively large inventory of boards. Although the accumulator may take various forms, such by way of example may include a conveyor assembly 177 operative to convey the boards on edge after the boards have been righted by a board pivoting device 178 located at the upstream end of the extraction chamber. Such conveyor assembly 177 may be similar to the above described accumulating conveyor assemblies wherein the boards are held in vertical position and spaced facial relationship. At the downstream end of the accumulator, the boards may be discharged from the extraction chamber onto the respective take-away conveyor 174, 175 in such vertical position or in horizontal position. In the latter case, the boards may be returned from vertical to horizontal position by means of a board pivoting device located at the downstream end of the extraction chamber.

The extraction chambers 156 and 157 and the vacuum chamber 158 are provided with respective vacuum pumps 180–182 and associated vacuum controls (not shown) for generating and maintaining reduced pressure in such chambers independently of each other. The extraction chambers also may be provided with respective vacuum break valves (not shown) for rapidly vitiating developed vacuum therein.

In operation of the apparatus 155, both extraction chambers 156 and 157 initially may be in their offset positions to allow scrap board to be removed directly from the vacuum chamber 158 during start-up. Once the foam extrusion line is stabilized, either one of the extraction chambers such as the extraction chamber 156 may be connected to the vacuum chamber and both brought to desired vacuum. At this time, the vacuum chamber gate 160 as well as the inlet gate 166 of the extraction chamber 156 will both be open to allow passage and accumulation of boards in the extraction chamber, such boards initially being scrap until the extrusion line has been stablized under reduced pressure for commercial production. Of course, the outlet gate 167 of the chamber 156 will be closed for maintenance of reduced pressure.

As the scrap boards are being accumulated into the then connected extraction chamber 156, the other extraction chamber 157 may be brought to desired vacuum equivalent to that in the vacuum chamber 158. Once the extrusion line has become stablized for commercial production, the vacuum chamber gate 160 and the inlet gate 166 of the then connected extraction chamber 156 are both closed, the extraction chamber 156 then shifted out of alignment with the vacuum chamber and then the other extraction chamber 157 shifted into alignment with the vacuum chamber for receipt and accumulation of boards upon opening of the inlet gate 166 thereof and reopening of the vacuum chamber gate 160. During such switching of the extraction chambers, the board take-away conveyor 170 in the vacuum chamber may be temporarily operated to accumulate boards thereon until such time the newly connected extraction chamber 157 is ready to receive the boards.

While the extraction chamber 157 is being filled with the foam boards, the other extraction chamber 156 loaded with boards is brought back to atmospheric pressure and the outlet gate 167 opened for passage of the boards to the take-away conveyor 170. After the extraction chamber 156 has been emptied, the outlet gate 167 is again closed and such chamber restored to reduced pressure equivalent to that in the vacuum chamber 158. The extraction chamber 156 would then be ready for exchange with the extraction chamber 157 after the latter has been filled with foam boards. After the exchange, the extraction chamber 157 is emptied but onto the other take-away conveyor.

As will be appreciated, other arrangements of movable extraction chambers may be employed. By way of example, a series of extraction chambers may be located on the outside circumference of a wheel or platform which pivots either on a horizontal or vertical axis for alternating connection to a vacuum chamber for operation in a manner similar to that previously described. Such a platform need not travel through full 360° rotation but instead may rotate back and forth through an arc of say 90°. In such other arrangements, a board take-away device may be located at the pivot axis of the platform for board discharge at the radially inner end of each chamber or at the circumference of such platform for board discharge from the same end through which such boards are received from the vacuum chamber.

The FIG. 7 Embodiment

In FIG. 7, another embodiment of the invention indicated generally at 185 can be seen to employ three extraction chambers or air locks 186–188 disposed at right angles at the downstream end of a vacuum extrusion chamber 189. Two air locks 186 and 187 are located in opposition at opposite sides of the vacuum chamber 189 whereas the other air lock 188 is located in line with the vacuum chamber. As shown, the downstream end of the vacuum chamber may have branched end portions 190–192 to which the extraction chambers are respectively connected at sealed gates 193–195 which are opened and closed by doors 196–198, respectively. Accordingly, the vacuum chamber and the air locks may be formed in an overall environmental control housing having the shape of a cross or "t". The air locks 186–188 also have sealed outlet gates 199–201 which are opened and closed by doors 202–204 respectively.

Like in the aforedescribed embodiments, the head of the vacuum chamber 189 is closed by a bulkhead 207. The vacuum chamber also has associated therewith extrusion line components including an extruder system 208, shaping rolls 209, an extrudate conveyor 210, a broad cut-off device 211, and a board take-away conveyor 212. In this embodiment, however, the board take-away conveyor 212 extends to a multi-directional transfer device 213 located at the junction of the branched vacuum chamber end portions 190–192. The transfer device 213 may be of any suitable type operative selectively to move a board received thereon along any one of the board paths respectively indicated by the arrows 214–216, such board paths extending through respective branched end portions to the air locks 186–188, respectively. For example, the transfer device 213 may consist of a conveyor mounted on a platform which rotates or pivots on a vertical axis for selective alignment of the conveyor with the board paths. Each vacuum chamber branch also may include suitable conveyance means for transferring the boards along the board path therein and to the respective air lock for subsequent discharge therefrom by a suitable board ejector or transfer device located in each air lock.

The vacuum pump for the vacuum extrusion chamber 189 is indicated at 219 and respective vacuum pumps for the air locks 186–188 at 220–222, respectively. The pumps 220–222 may be manifolded in such manner that if one malfunctions, the other operative vacuum pumps may take over for the failed vacuum pump. Of course, other suitable means may be employed controllably to maintain reduced pressure in the vacuum chamber and air locks.

Each air lock 186–188 may be sized as shown to accomodate a single board or to handle an inventory of boards as in a manner similar to that described above with respect to the other embodiments of the invention.

In operation of the apparatus 185, the boards delivered by the board take-away conveyor 212 are alternately fed by the transfer device 213 to the air locks 186–188 for discharge to the atmosphere. As before, the inlet and outlet gates for each air lock are opened and closed and the air lock cycled between reduced and atmospheric pressure to effect discharge of the board or boards therein to the atmosphere, but in out-of-phase relationship so that when one air lock is at reduced pressure and open to the vacuum chamber for receipt of a board or boards, the other air locks may be in the process of discharging the board or boards therein to the atmosphere after being brought to atmospheric pressure.

As will be appreciated, configurations similar to that seen in FIG. 7 may be constructed with any number of extraction chambers or air locks. By way of further example, FIG. 8 shows another embodiment of the invention employing five air locks 225–229 at the downstream end of a vacuum extrusion chamber 230. Two air locks are located on each side of the vacuum chamber in opposition to respective air locks on the other side, and the remaining air lock disposed in line with the vacuum chamber as illustrated. The respective board transfer paths leading to the air locks 225–229 are indicated at 231–235, and a multi-directional transfer device may be located at each common point of divergence of the paths and controlled for selective transfer of boards to the air locks.

As seen in FIG. 8, the vacuum extrusion chamber 230 may be divided into an upstream movable section 238 and a downstream stationary section 239. Such an arrangement is particularly desirable in larger systems employing multiple air locks for facilitating extrusion line start-up and providing access to the interior of the vacuum chamber for maintenance of extrusion line components located therein. As shown, the upstream section 238 may be mounted on parallel rails 240 extending parallel to the vacuum chamber. Also, the bulkhead 241 closing the end of the vacuum chamber and an associated extruder 242 and extrusion die support frame 243 may also be mounted on respective sets of rails 244–246 for movement independently of the vacuum chamber section 238 as well as each other.

The FIG. 9 Embodiment

In FIG. 9, there is shown still another embodiment of the invention, indicated generally at 240, wherein the cut lengths or boards 241 are stacked within the vacuum extrusion chamber 242 and passed as a stack into an extraction chamber or air lock 243 for subsequent discharge to a destacking device 244 located outside the air lock 243. Like in the aforedescribed embodiments, the head of the vacuum chamber 242 is closed by a bulkhead 245 through which extends a pipe 246 connecting an extruder 247 to an extrusion die 248 located inside the vacuum chamber 242. The vacuum chamber 242 also accomodates other extrusion line components which include, going from left to right, shaping rolls 249, an extrudate take-away conveyor assembly 250, a water applicator 251, a board cut-off device 252 and a board take-away conveyor 253. As shown, the extrudate take-away conveyor assembly 250 may consist of an initial series of rollers transversely extending beneath the extrudate path coextensively with the water applicator 251 and upper and lower belt conveyors 255 and 256 between which the extrudate is conveyed to the cut-off device 252.

At the downstream end of the board take-away conveyor 253, there is provided a board stacking device 258 within the vacuum chamber 242. The board stacking device includes a stacking table or platform 259 which is supported for vertical movement by a scissor mechanism 260 which may be located for example in a pit 261 at an elevation lower than the extrudate path through the vacuum chamber 242. The scissor mechanism 260 may be operated to adjust the height of the platform 259 relative to the board take-away conveyor 253 for proper stacking of the boards atop the platform 259. Initially, the platform 259 may be at or just below the elevation of the take-away conveyor 254 which operates to transfer boards onto the platform. As boards are successively stacked atop the platform, the scissor mechanism may be operated to index the platform downwardly to maintain the top of the stack at desired elevation for receipt of the next board to be stacked.

After a preselected number of boards have been stacked on the platform 259, the scissor mechanism 260 may be operated to lower the platform as needed to properly locate the stack in front of a stack ejector 264. The stack ejector, which may be similar to those described above, includes a pusher plate 265 connected to the rod 266 of a ram 267. The cylinder 268 of the ram preferably is located outside the vacuum chamber 242 with the rod 266 extending through a sealed opening in a side wall of the vacuum chamber pit 261. Upon actuation of the ram 264, the pusher plate will engage and push the stack horizontally for positioning in the air lock 243 atop a roller conveyor 269.

To permit such passage of the stack from the vacuum chamber 242 to the air lock 243, such chamber and air lock are interconnected by a sealed gate 272 which is opened and closed by an air lock door 273. At the side of the air lock 243 opposite the sealed gate 272, such air lock is connected to the atmosphere by a sealed outlet gate 274 which is opened and closed by an air lock door 275. When the gates 272 and 274 are closed the air lock 243 may be evacuated by means of a vacuum pump 276 and the reduced pressure in such air lock controlled by other suitable means such as a bleed valve. It also is noted that the vacuum chamber 242 may be evacuated independently of the air lock 243 by a vacuum pump 277 and the reduced pressure therein controlled for example by another bleed valve (not shown).

The board destacking mechanism 244 is located outside the air lock 243 adjacent the sealed outlet gate 274. Such device includes a stack platform 280 which is supported for vertical movement by a scissor mechanism 281 for vertical height adjustment. As will be appreciated, the scissor mechanism 281 may be operated to elevate the platform 280 and thus a stack of boards supported thereon so that the top board of the stack is brought into engagement with a horizontal belt conveyor 282 located above the platform 280. The belt conveyor 282 is driven by a drive 283 in the direction indicated by arrow 284. As the uppermost board of the stack is brought into engagement with the underside of the conveyor 282, such board will be engaged and removed from the stack to the right in FIG. 9 and onto another horizontal belt conveyor 285 located beneath the downstream end of the belt conveyor 282. The belt conveyor 285 is driven by a drive motor 286 preferrably at the same speed as the belt conveyor 282 for further transfer of the destacked board to the belt conveyors seen at 287 and 288 which may transfer the board to printing and finishing machinery, for example. Such conveyors 287 and 288 also may be driven by the drive motor 286 as shown.

In operation of the apparatus 240 the cut lengths or boards 241 are stacked atop the stacking platform 259 within the vacuum chamber 242 as indicated. After a preselected number of boards have been stacked, the platform may be properly positioned for subsequent passage of the stack into the air lock 243 by the ejector 264. At such time, the air lock will be connected to the vacuum chamber by the then open gate 272, and the outlet gate 274 will be closed for maintenance of reduced pressure in the vacuum chamber and air lock.

After passage of the stack into the air lock 243, the ejector 264 is retracted and the platform 259 positioned for formation of another stack of boards. The gate 273 then may be closed and the vacuum in the air lock vitiated. After the air lock reaches atmospheric pressure, the outlet gate 274 is opened and the roller conveyor 269 driven to pass the stack through the outlet gate 274 onto the platform 280 of the destacking device 244 for subsequent destacking and conveyance of the boards individually to further processing equipment. Once the stack is discharged from the air lock, the outlet gate 274 is closed and vacuum restored in the air lock. When the reduced pressure in the air lock equals that in the vacuum chamber, the gate 272 can be opened for passage of a next stack into the air lock without affecting reduced pressure in the vacuum chamber. In this manner, a plurality or inventory of the boards may be removed from the vacuum chamber during each vacuum cycle of the air lock.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. A method for producing foamed bodies comprising the steps of continuously extruding foamable material into a first zone at reduced pressure to form a continuous length of foamed extrudate, cutting the foamed extrudate within the first zone to obtain foamed pieces of predetermined length, characterized by cyclically alternating a second zone between such reduced pressure and external pressure without affecting the reduced pressure in the first zone, passing a plurality of the foamed pieces to the second zone when in the reduced pressure portion of each cycle, and discharging such plurality from the second zone when in the atmospheric pressure portion of the cycle.

2. A method as set forth in claim 1, including the steps of stacking the foamed pieces in the first zone when the second zone is in the atmospheric pressure portion of its cycle and then passing the stack to the second zone when in the reduced pressure portion of its cycle.

3. A method as set forth in claim 1, including the steps of stacking a plurality of the foamed pieces in the second zone when in the reduced pressure portion of its cycle and then ejecting the foamed pieces as a stack from the second zone when in the atmospheric pressure portion of its cycle.

4. A method as set forth in claim 1, including the step of accumulating a plurality of the foamed pieces in vertical position and close but spaced facial relationship whereby substantially the entire surface areas of such accumulated foamed pieces may be exposed to reduced pressure prior to discharge from the second zone.

5. A method as set forth in claim 4, including the step of conveying such accumulated foamed pieces at a relatively slow rate when the second zone is not at reduced pressure and at a faster rate when the second zone is at reduced pressure to effect rapid passage of accumulated foamed pieces into the second zone.

6. A foam extrusion method comprising the steps of continuously extruding foamable material into a first chamber at reduced pressure to form a continuous length of foamed extrudate, cutting the extrudate to length within the first chamber, characterized by cyclically alternating multiple second chambers between such reduced pressure and outside pressure in out of phase relationship, transferring the cut lengths to the second chambers in alternating sequence when each is at reduced pressure, and discharging the cut lengths from the second chambers is alternating sequence when each is at outside pressure.

7. A method as set forth in claim 6, including the step of alternately connecting and disconnecting the second chambers to the first chamber respectively for receipt and discharge of the cut lengths.

8. A method as set forth in claim 6, wherein the step of transferring includes inventorying a plurality of cut lengths in each second chamber during the reduced pressure portions of each cycle.

9. Foam extrusion apparatus comprising a first chamber, means to maintain said first chamber at reduced pressure, means to extrude foamable material into said first chamber to form a continuous length of foamed extrudate, and means to cut the foamed extrudate to length within said first chamber, characterized by a second chamber, means cyclically to alternate said second chamber between such reduced pressure and an external pressure without effecting the reduced pressure in said first chamber, means to inventory a plurality of the cut lengths in said second chamber when at such reduced pressure, and means to discharge the inventory from said second chamber when at external pressure.

10. Apparatus as set forth in claim 9, wherein said means to inventory includes means to assemble and/or position a stack of successively cut lengths in said second chamber.

11. Apparatus as set forth in claim 9, wherein said means to discharge includes means to eject the cut lengths as a stack from said second chamber.

12. Apparatus as set forth in claim 11, wherein said means to assemble and/or position includes means to assemble the cut lengths in a vertical stack with each cut length in horizontal position for subsequent ejection of the vertical stack from said second chamber.

13. Apparatus as set forth in claim 12, including destacking means located outside said second chamber for receiving and destacking each ejected vertical stack.

14. Apparatus as set forth in claim 13, wherein said destacking means includes a platform for supporting each ejected stack, conveyor means located above said platform for laterally removing an uppermost cut length from the stack upon engagement therewith, and means for vertically raising said platform to effect engagement of the uppermost cut length with said conveyor means and each following cut length upon removal of the preceding cut length.

15. Apparatus as set forth in claim 11, wherein said means to eject includes a stack pusher member and means to move said pusher member perpendicularly to the axis of the stack.

16. Apparatus as set forth in claim 15, wherein said pusher member is located in said second chamber and powered from outside said second chamber.

17. Apparatus as set forth in claim 9, wherein said means to inventory includes means to assemble horizontal cut lengths in a vertical stack within said first chamber and means then to pass the vertical stack to said second chamber when at reduced pressure.

18. Apparatus as set forth in claim 17, wherein said means to assemble includes means to convey each cut length from said means to cut in horizontal position and onto a horizontal stacking platform to form a stack of cut lengths on said platform, and means vertically to move said platform to adjust the height of the stack relative to said means to convey.

19. Apparatus as set forth in claim 17, wherein said means to pass includes a stack pusher member movable between said chambers but powered from outside said chambers.

20. Apparatus as set forth in claim 9, including means to convey each cut length away from said means to cut in horizontal position, means then to right each cut length from horizontal to vertical position, and means then to assemble successively righted cut lengths as a horizontal stack in said second chamber for subsequent discharge therefrom.

21. Apparatus as set forth in claim 9, further comprising means for accumulating a plurality of the cut lengths in vertical position and for holding such accumulated cut lengths in spaced facial relationship whereby substantially the entire surface areas of such accumulated cut lengths may be exposed to reduced pressure prior to discharge from said second chamber.

22. Apparatus as set forth in claim 21, wherein said means for accumulating includes a bottom conveyor on which the cut lengths are supported on edge and side conveyors on opposite sides of said bottom conveyor, said side conveyors including opposed means for engaging and holding the cut lengths in vertical position and spaced apart.

23. Apparatus as set forth in claim 22, wherein said bottom and side conveyors are synchronously driven.

24. Apparatus as set forth in claim 21, wherein said means for accumulating is located in said first chamber.

25. Apparatus as set forth in claim 24, wherein said means for accumulating includes serially arranged upstream and downstream conveyor assemblies each operative to accumulate and convey a plurality of cut lengths therelong, said downstream conveyor being operative to accelerate and quickly discharge cut lengths therefrom and into said second chamber when said second chamber is at reduced pressure.

26. Apparatus as set forth in claim 25, including sealed gates interconnecting said first and second chambers and said second chamber to the outside at such external pressure.

27. Apparatus as set forth in claim 26, wherein said downstream conveyor accelerates and quickly discharges the cut lengths when said gate between said chambers is open and then operates at a slower rate when such gate is closed.

28. Apparatus as set forth in claim 27, wherein said upstream conveyor operates at a rate corresponding to the rate at which foamable material is extruded into said first chamber, and said downstream conveyor at the same rate when the gate between said chambers is closed.

29. Apparatus as set forth in claim 25, wherein said first chamber has right angle first and second legs respectively terminating at said means to extrude and said second chamber, and said means for accumulating extending along said second leg.

30. Apparatus as set forth in claim 29, including means at the union of said legs for pivoting the boards from horizontal to vertical position.

31. Apparatus as set forth in claim 9, including sealed gates interconnecting said first and second chambers and said second chamber to the outside at such external pressure.

32. Apparatus as set forth in claim 31, wherein said sealed gates open alternately in response to the pressure cycle of said second chamber.

33. Apparatus as set forth in claim 9, wherein there are at least two second chambers, and multi-directional transfer means downstream of said means to cut for selectively transferring cut lengths to either of said second chambers.

34. Apparatus as set forth in claim 33, wherein said second chambers cyclically alternate between such reduced and external pressures in out of phase relationship.

35. Apparatus as set forth in claim 34, wherein said transfer means is operative to transfer a plurality of cut lengths to each chamber during the reduced pressure portion of its pressure cycle.

36. Apparatus as set forth in claim 35, further comprising within each second chamber, respective means for accumulating a plurality of the cut lengths in vertical position and for holding such accumulated cut lengths in spaced facial relationship whereby substantially the entire surface areas of such accumulated cut lengths may be exposed to reduced pressure prior to discharge from said second chamber.

37. Apparatus as set forth in claim 36, wherein said transfer means includes a bi-directional pivoting device for turning each cut length on either edge for respective transfer in vertical position to said means for accumulating in each second chamber.

38. Apparatus as set forth in claim 33, including sealed gates interconnecting said first chamber with each second chamber, and each second chamber to the outside at external pressure.

39. Foam extrusion apparatus comprising a first chamber at reduced pressure into which foamable material is extruded to form a continuous length of foam extrudate, and means operative to cut the extrudate to length within said first chamber, characterized by multiple second chambers which cylically alternate between such reduced pressure and atmospheric pressure in out of phase relationship, means to transfer the cut lengths from said first chamber to said second chambers in alternating sequence when in the reduced pressure portion of their respective cycles, and means to discharge the cut lengths from said second chambers to the atmosphere when in the atmospheric pressure portion of their respective cycles.

40. Apparatus as set forth in claim 39, wherein said second chambers are supported for movement to and from said first chamber respectively for receipt and discharge of cut lengths.

41. Apparatus as set forth in claim 40, wherein said first chamber has a sealed gate closing its downstream end and each second chamber a sealed gate closing its upstream end, which upstream end is adapted to be connected to the downstream end of said first chamber.

42. Apparatus as set forth in claim 41, wherein said second chambers also have sealed gates at their downstream ends which open to permit discharge of cut lengths from said second chambers.

43. Apparatus as set forth in claim 40, wherein said second chambers are transversely movable into and out of alignment with said first chamber.

44. Apparatus as set forth in claim 39, wherein each second chambers includes means to inventory a plurality of cut lengths therein during the reduced pressure portion of its cycle.

45. Apparatus as set forth in claim 39, wherein said second chambers diverge from a common point, and said means to transfer includes a multi-directional transfer located at such point of divergence.

46. Apparatus as set forth in claim 39, wherein said first chamber has downstream branched end portions terminating at respective second chambers.

47. Apparatus as set forth in claim 39, wherein said first chamber has a downstream section connected to said second chambers and an upstream section mounted for movement towards and away from said downstream section.

48. Apparatus as set forth in claim 47, wherein the foamable material is extruded into said first chambers by extruder means mounted for movement independently of such upstream section.

* * * * *